United States Patent [19]

Humiston

[11] 4,186,311
[45] Jan. 29, 1980

[54] HEAT PUMP METHOD OF CONCENTRATING FLUIDS

[76] Inventor: Gerald F. Humiston, E 26, 1335 U.S. Highway 19 South, Clearwater, Fla. 33516

[21] Appl. No.: 807,354

[22] Filed: Jun. 17, 1977

[51] Int. Cl.² .............................................. H02P 9/04
[52] U.S. Cl. .................................... 290/1 R; 60/641; 60/398; 290/52
[58] Field of Search ....................... 60/398, 641; 290/1, 290/2, 52

[56] References Cited

U.S. PATENT DOCUMENTS

| 995,219 | 6/1911 | Bradley | 60/641 |
|---|---|---|---|
| 2,006,985 | 7/1935 | Claude et al. | 60/641 X |
| 2,595,164 | 4/1952 | Nisolle | 60/641 X |
| 3,490,513 | 1/1970 | Villanueva | 60/641 X |
| 3,967,449 | 7/1976 | Beck | 60/398 X |

FOREIGN PATENT DOCUMENTS

| 878711 | 1/1943 | France | 60/641 |
|---|---|---|---|
| 1036388 | 4/1953 | France | 60/398 |

*Primary Examiner*—Gene Z. Rubinson
*Assistant Examiner*—John W. Redman
*Attorney, Agent, or Firm*—Stein & Frijouf

[57] ABSTRACT

An apparatus is disclosed for concentrating fluid and for providing electrical power. The apparatus comprises an evaporator and a condenser interconnected by a conduit. A heat exchanger thermally couples warm liquid to the fluid in the evaporator. Means are provided for coupling a cool liquid to the condenser, thereby creating a mass flow of vapor from the evaporator to the condenser. A prime mover is interposed in the conduit for converting the mass flow of vapor into mechanical movement. An electrical generator is coupled to the prime mover enabling an electrical control to direct the output of the electrical generator for operating the apparatus and for directing excessive electrical energy produced by the electrical generator for external use.

10 Claims, 3 Drawing Figures

HEAT PUMP METHOD OF CONCENTRATING FLUIDS

BACKGROUND OF THE INVENTION

1. Field of the Invention

This invention relates to a heat pump process and apparatus which is applicable to the concentration of fluids, distillation and desalination, power generation and cooling of discharges from nuclear and thermal electrical generating plants, and the like.

2. Description of the prior art

As is recognized by all, many applications exist which require the use of solutions from which solids and dissolved substances must be separated. Many processes have been developed heretofore for purposes of accomplishing this function of separation. Distillation and particularly vacuum distillation is a highly effective technique for removing water from a solution in such a manner and at such a rate as to leave the residual solution at a desired concentration rate. However, present distillation, or concentration, techniques require substantial amounts of energy. Even though some distillation, or concentration, techniques are considerable improvements over others, these concentration processes consume vast amounts of fossilized fuel or, in the case of vapor recompression systems, electrical energy. The impending shortages and escalating prices of fossilized fuels, to encourages the expanded use of the 'natural' energy sources such as geo-thermal, direct solar energy, indirect solar energy, hydro energy, etc.

Accordingly, it is an object of the present invention to provide a novel process and apparatus for the concentration of solutions, production of distilled or desalinated water, and the production of electrical power from an energy source consisting of the temperature differentials between two water soures such as the ocean where the surface of the ocean is considerably warmer, than the cold sub-surface water.

It is also an object to provide such a process and apparatus which are capable of operating, by means of a vacuum, at the temperature of the warm water source and the cold water source, not requiring any addition of conventional energy.

Another object is to provide a means wherein the process and apparatus is capable of producing enough electrical energy to sustain its own operation as well as producing excess electrical energy over that required to sustain its own operation by utilizing the mass flow of water vapors between the evaporator and the condenser of the apparatus to drive a prime mover which is connected to an electrical generator.

A further object is to provide such a process and apparatus with means to bring fluids into contact with the process and apparatus and further a means of removing the fluids after concentrating, and excess electrical energy from the process and apparatus.

Other objects and a fuller understanding of this invention may be had by referring to the summary of the invention, the description and the claims, taken in conjunction with the accompanying drawings.

SUMMARY OF THE INVENTION

It has been found that the foregoing and related objects may be readily attained by a method for the concentration of a solution by the removal of water from the solution by vacuum distillation by the thermal coupling of the solution with a warm water source while a condenser, thermally couples the vapors of such distilling process with cooling, or condensing, water. The concentration apparatus includes a heat exchanger in thermal contact with a warm water source. A means of supplies the solution to be concentrated to the heat exchanger. A liquid level control means maintains the level of the solution above the heat exchanger by controlling the inlet fluid valve thus establishing an evaporator section in the apparatus. A particle separation chamber is disposed in conduit means connecting the particle separation chamber means with a condenser means. A prime mover is interposed into the said conduit means with an electrical generator means coupled to the said prime mover means to convert the power generated by the said prime mover means to electrical energy. Cooling or condensing water from the cold water is directed to the said condenser means. An electrical control means directs the output of the said electrical generator means to the various pumps and controls of the apparatus and directs any excess electrical energy for external usage. A vacuum pump means initially reduces the pressure in the apparatus to the saturation pressure of the warm water source or to further remove any non-condensable vapors from the apparatus during operation. A density control means senses the density of the fluid in the evaporator. A pump means and a valve means directs the fluid from the evaporator from the apparatus when the density of the fluid, or solution, is at the desired density, or concentration, and to recirculate the the fluid back into the evaporator when the density, is below the desired density level. The warm water source is in thermal contact with fluid to be concentrated by means of the heat exchanger. Thus, the process is made self sustaining with only the differential temperatures between the warm water source and the cold water source providing the energy required to power the apparatus.

A fundamental characteristic of the heat pump system, of which this invention is a novel variation, comprises a closed loop system established between an evaporator means where a fluid is subjected to the conditions for evaporation and a condenser means wherein the water vapors are condensed thereby liberating the heat of condensation. In the case of the subject invention, the heat to the evaporator means is furnished by the warm water source, and the cooling, or condensing, means for the condenser means is furnished by the cold water source, the process operating at the saturation pressures dictated by the various water temperatures in the apparatus. The prime mover means interposed in the closed loop provides the power to drive an electrical generator means and with an electrical control means directing electrical energy to the elements of the apparatus. A vacuum pump establishes the initial negative, or saturation, pressure of the apparatus and during operation removes any non-condensable vapors. The practice of the instant invention enables an apparatus capable of concentrating fluids, or solutions, with power generation sufficient to make the apparatus self sustaining, to be operated with two water sources at different temperatures, and additionally, to provide excess electrical energy for external usage.

This invention accordingly comprises a process and an apparatus possessing the features, properties and the relationship of elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE DRAWINGS

Figure 1:
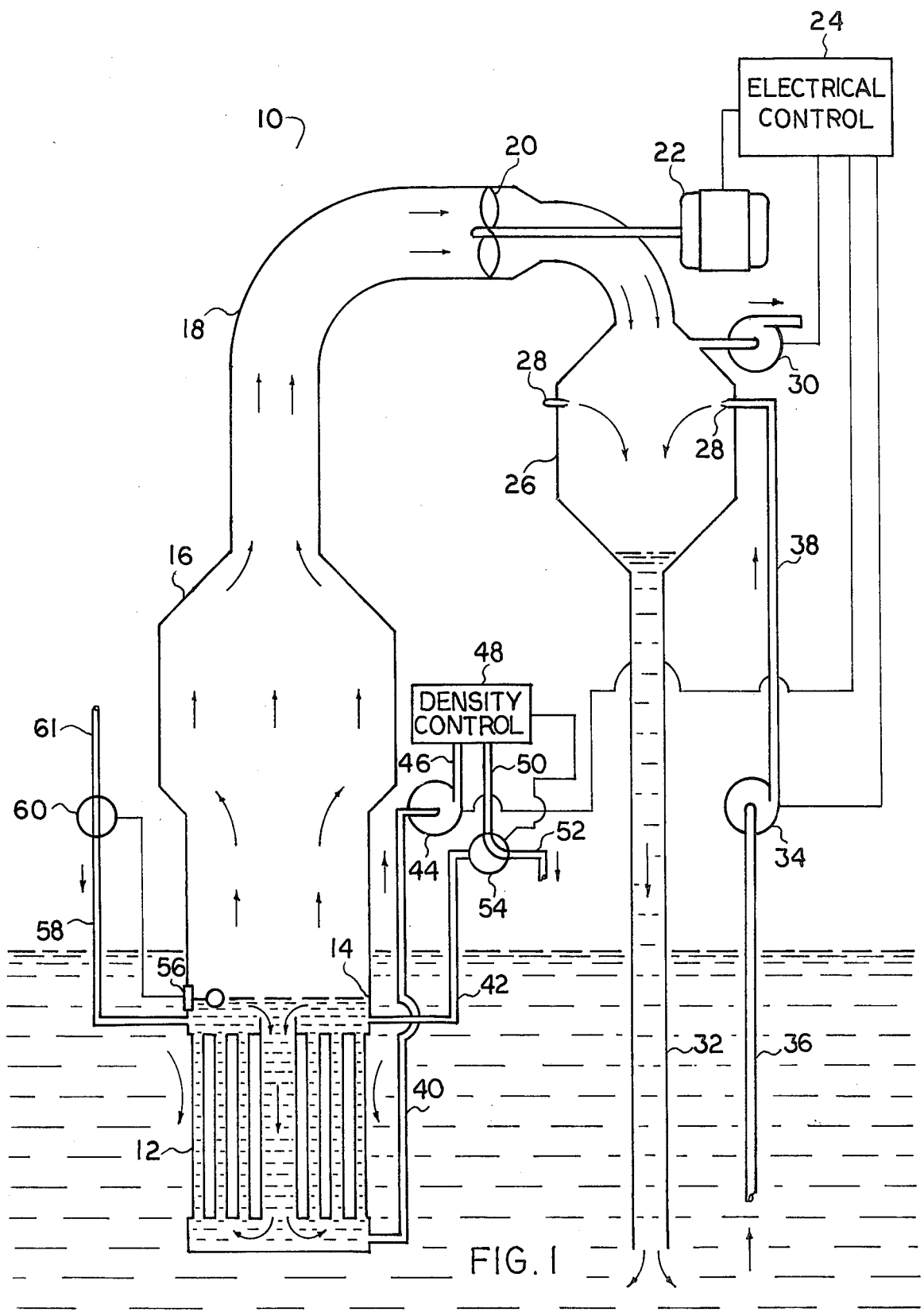
FIG. 1 is a first embodiment of the invention.

Referring now in detail to FIG. 1 of the drawings, therein illustrated is one embodiment of an apparatus for the concentration of fluids, solutions, which functions as a concentrating apparatus by the continual removal of water in the form of water vapor from the fluid to be concentrated, by the process of evaporation. More specifically, the apparatus as depicted in FIG. 1 is particularly adapted to utilize the energy existing in the temperature differentials between two water sources to accomplish evaporation and condensation, with a resulting concentration of the process fluid by means of the removal of water in the form of water vapor from the process fluid by means of the evaporation process. The apparatus provides its own energy source by means of a prime mover interposed between the evaporator and the condenser, utilizing the mass flow of water vapors, low temperature steam, and the pressure difference existing between the evaporator portion of the apparatus and the condenser portion of the apparatus to drive an electrical generator and subsequently the elements of the apparatus.

The major components of the apparatus illustrated in FIG. 1 of the drawings include a heat exchanger generally designated by the numeral 12. The heat exchanger 12 functions as a means of establishing thermal contact between the fluid in the heat exchanger 12 and the warm water source into which the heat exchanger 12 is submerged. The fluid to be concentrated enters the system through a conduit 61, an inlet valve 60, and another conduit 58. The operation of the inlet valve 60 is controlled by a liquid level control 56 which operates inlet valve 60 to maintain the level of the fluid above the heat exchanger 12 thereby establishing an evaporator 14 portion of the apparatus 10. A concentrate pump 44 pumps the fluid from the heat exchanger 12, by means of conduit 40 and conduit 46, through a density control 48 and another conduit 50 to a divert valve 54. The density control 48 senses the density of the fluid being pumped through it and when it senses a fluid density at or above the desired density of the fluid, diverts the fluid from the apparatus 10 through conduit 52. When the density control 48 senses a density of the fluid less than the desired density, the density control 48 diverts the fluid back into the evaporator 14 through conduit 42 until such time as the density of the fluid again reaches the desired density level. A particle separation chamber 16 is located above the evaporator 14 of such diameter that the water vapors from the evaporator 14 are sufficiently reduced in velocity to prevent liquid or discrete particles from reaching other portions of the apparatus 10. Conduit 18 connects the particle separation chamber 16 to condenser 26. Although there are various types of condensers, several of which are later illustrated, the condenser 26 illustrated is a simple wet, or spray, type of condenser in which the cooling, or condensing, water is sprayed directly into the condenser 26 through spray nozzles 28 and resulting in the cooling, or condensing, water coming into direct contact and intermingling with the water vapors in the condenser 26 effecting condensation of the water vapors with a high degree of efficiency. A pump 34 draws the cooling, or condensing water through a conduit 36 and pumps the same through a conduit 38 to the spray nozzles 28 in the condenser 26. A barametric conduit 32 is connected to the condenser 26 and the water source, which in the case illustrated is the ocean, but, could be any water source. The barametric conduit 32 is of such height as to form a barametric leg in which water will only rise to a desired height when the condenser 26 is at the saturation pressure dictated by the temperature in the condenser 26. The barametric conduit 32 is the means for returning the condensate water and the condensing water to the ocean, or other water source, while maintaining the negative pressure of the apparatus 10. A vacuum pump 30 is connected to the apparatus 10 at the condenser 26 to initially reduce the pressure in the apparatus 10 to the saturation pressure of the warm fluid in the evaporator 14 and further during operation of the apparatus 10 to remove any non-condensable vapors or gases which would be detrimental to the process if allowed to accumulate in the apparatus. A prime mover 20 is interposed in the conduit 18 connecting the particle separation chamber 16 and the condenser 26. The prime mover 20 dervies power from the mass flow of water vapors, low temperature steam, from the evaporator 14 to the condenser 26. The evaporator 14, is at the saturation pressure for the temperature of the fluid in the evaporator 14, which is heated by the warm surface ocean water, or other warm water source. The condenser 26 is at the saturation pressure for the temperature of the colder sub-surface ocean water, or other cooling water. The type of prime mover 20 is, for clarity, shown as a simple axial turbine, although the variety of applications of the invention might dictate other prime movers such as multi-stage turbines, roots type positive displacement prime movers, and others well known and used to derive rotary motion from pressure differentials and mass flow of vapors. An electrical generator 22 is coupled to the prime mover 20 and converts the power developed in the prime mover 20 to electrical energy. An electrical control 24 directs the electrical power from the generator 22 for use to operate the various elements of the apparatus 10 and further directs any excess electrical power for external usage.

With further reference to FIG. 1 of the drawings, the process is initiated by the vacuum pump 30 evacuating the air from the closed apparatus 10. The vacuum pump 30 reduces the pressure in the closed apparatus 10 until the pressure in the apparatus 10 reaches the saturation pressure dictated by the fluid in the evaporator 14 and the heat exchanger 12, which is heated by the warm surface ocean water, or other warm water source. Since the liquid level control 56 senses a liquid level below that desired, the inlet valve 60 remains open until the heat exchanger 12 and the evaporator 14 are at the correct liquid level, the fluid being drawn into the apparatus 10 by the negative pressure existing in the apparatus 10 by action of the vacuum pump 30. For example, if the fluid in the evaporator 14 is heated to 80° F., then the pressure left in the apparatus 10 would be the saturation pressure of water at 80° F., or approximately 0.507 psia. With the continued operation of the vacuum pump 30, the closed apparatus 10 then fills with water vapor at the saturation temperature and pressure of 80° F. and 0.507 psia.

Because of the difference in the pressure in the closed apparatus 10 and the pressure of the atmospheric air surrounding the closed apparatus 10, the ocean water, or other water source, rises until the water in the barametric conduit 32 has created a head pressure at the ocean surface, or other water source, equal to the atmospheric pressure. In the case of atmospheric pressure at 14.7 psia, the difference in pressure between the closed apparatus 10 and the atmospheric pressure outside of the closed apparatus 10 would be approximately 14.193 psi and would therefore cause the ocean water, or other water source, to rise in the barametric conduit 32 approximately 31.8 feet above the surface of the ocean, or other water source. The cooling water pump 34 is then started to draw cold deep ocean water, or other cold water source, through conduit 36 and pump the same through conduit 38 to the spray nozzles 28 in the condenser 26. This cooling, or condensing, water sprayed into the condenser 26 through spray nozzles 28 intermingle with the water vapors in the condenser 26, causing them to condense, releasing the heat of condensation to the condensing water. The cooling or condensing water and the condensed water vapors, now condensate water return to the ocean, or other water source by means of the barametric conduit 32. The warmer vapors present in the evaporator 14 then flow to the condenser 26 portion of the apparatus 10 where they are condensed to a liquid. The rapid flow of vapors existing from the evaporator 14 to the condenser 26 is caused by the reduction in volume of the water vapors in the condenser 26. This mass flow of water vapors, low temperature steam, from the evaporator 14 to the condenser 26, drives the prime mover 20, located in the conduit 18 between the evaporator 14 and the condenser 26. Power is thus provided to the electrical generator 22 which is coupled to the prime mover 20. Heat for continued evaporation in the evaporator 14 is supplied by the thermal circulation of the warm surface ocean water, or other warm water source, in contact with the heat exchanger 12. This thermal circulation is established as the heat from the warm water source is lost to the fluid in the heat exchanger 12 and when cooled water migrates downwardly and is replaced by warmer water. The heat of vaporization lost to the water vapors evaporated in the evaporator 14 is thus constantly replaced. The concentrate pump 44 is operated to draw process fluid through conduit 40 and pump the same through conduit 46 and then through a density control 48 and another conduit 50 to a divert valve 54. When the density control 48, which is preset to the desired density level of the process fluid, senses the density of the fluid being pumped to be at or above the desired density of the fluid directs, diverts the fluid is directed from the apparatus 10 through conduit 52 as a primary product of the process. When the density control 48 senses a density of the fluid less than the desired density, the density control 48 diverts the fluid, by means of the divert valve 54, back into the evaporator 14 through conduit 42, until such time as the density of the fluid again reaches the desired density level. The level of the process fluid in the evaporator 14 is constantly maintained by the liquid level control 56 controlling the inlet valve 60 to maintain the desired fluid level. It can thus be seen that the negative pressure in the apparatus 10 provides a means of bringing the process fluid into the apparatus, and the barametric conduit 32 provides a means of removing condensing water and condensate water from the condenser 26, even though the apparatus 10 is at a pressure considerably lower than that of the atmospheric air outside of the closed apparatus 10. An electrical control 24 directs the electrical output of the electrical generator 22 to the necessary elements of the apparatus 10 and diverts any excess electrical energy for external usage. The apparatus 10 has thus provided for itself a power source to sustain its own operation and provide external energy for external usage. During initial startup of the apparatus 10, since no electrical energy exists at the electrical control 24, the power to initiate the process and apparatus 10 must be external and could be provided by storage batteries which would be recharged during system operation or an auxiliary power generator.

Figure 2:
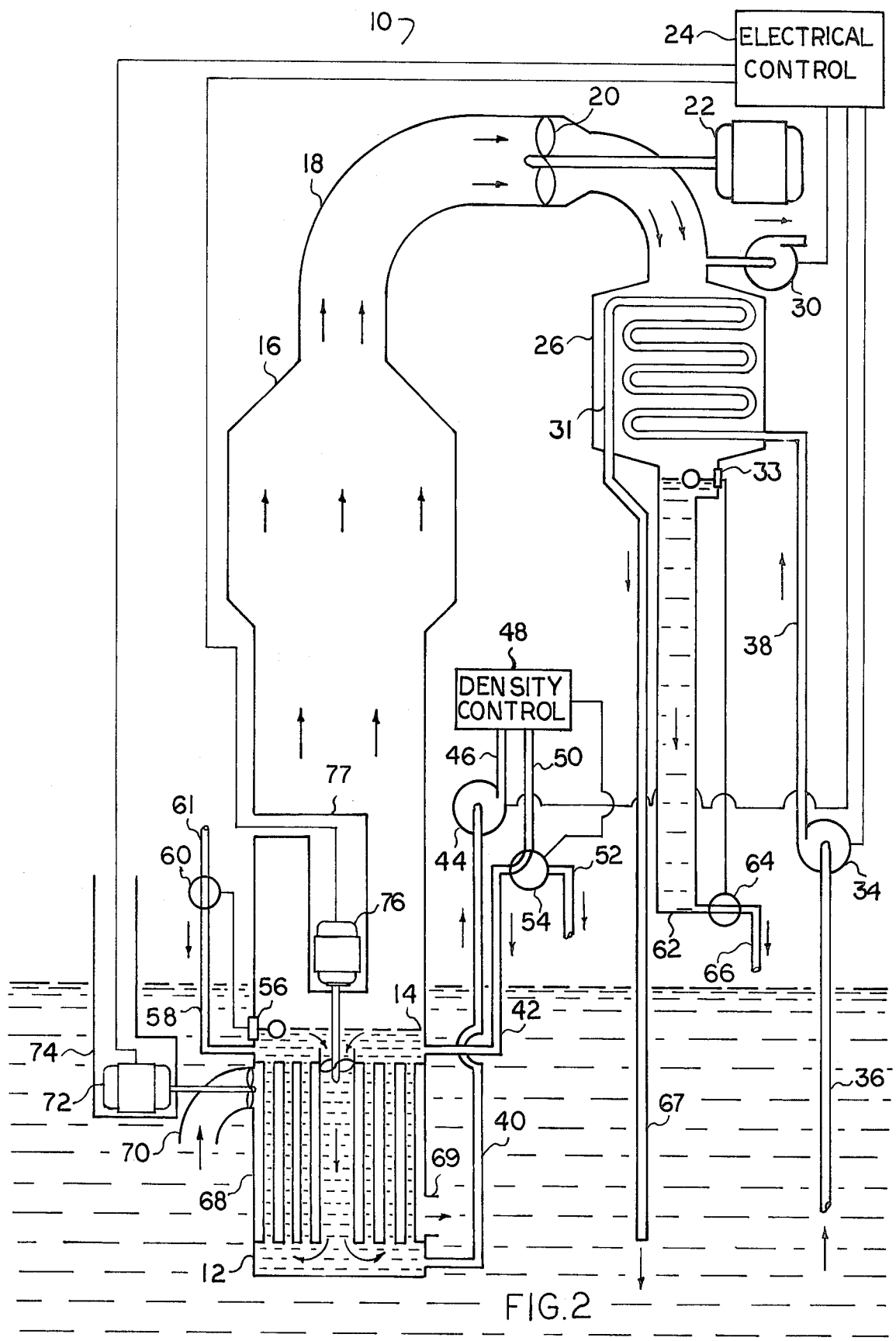
FIG. 2 is a second embodiment of the invention.

Turning now to FIG. 2 of the attached drawings, therein illustrated is an apparatus 10 as described in FIG. 1 except for the following embodiments which modify the apparatus 10 for particular design requirements. The efficiency of the heat exchanger 12 can be improved when the circumstances dictate by the addition of an enclosure 68, an input means 70 to the enclosure 68, an outlet means 69 from the enclosure 68, and a circulating pump means 72. With this embodiment of the invention the heat exchanger 12 may still be submerged into the warm water source, however, this is not necessary as warm water from the warm water source may be now directed in the input means 70 and discharged from the enclosure 68 by means of the outlet means 69. When the warm water source is inputed into the enclosure 68 through the input means 70 and the heat exchanger 12 is not submerged into the warm water, the enclosure 74 for the circulating pump 72 is not required. Additionally, a circulating pump 76 is located within the heat exchanger 12.

The circulating pump 72 draws warm water from the warm water source through the input means 70 and circulates this warm water through the area between the heat exchanger 12 and the enclosure 68 and then from the heat exchanger area by the outlet means 69. This forced circulation improves the efficiency of the heat transfer between the warm water and the fluid within the heat exchanger 12. The circulating pump 76 located within the heat exchanger 12 is used to improve heat exchanger 12 efficiency by circulating the fluid within the heat exchanger 12 at a rate greater than that caused by thermal circulation alone.

With further reference to FIG. 2 of the drawings, a method is illustrated whereby the condensate water, which is a result of the evaporation and condensing process, can be removed from the apparatus without being returned to the water source by means of a barametric conduit connected to the water source. A barametric conduit 62 is connected to the condenser 26 and is of such height as water in this barametric conduit 62 will create a head pressure equal to the difference between the atmospheric pressure and the pressure in the condenser 26, plus an additional head sufficient to give the desired head pressure at the condensate water valve 64. A liquid level control 33 located at the top of the barametric conduit 62 controls the condensate water valve 64 and allows the condensate water valve 64 to discharge condensate water through conduit 66 while maintaining the desired head in the barametric conduit 62. Since, in this configuration, it is not desirable to mix the condensing water and the condensate water, a condenser 26 with a tubular 31 or plate construction must be used in place of the wet, or spray, type of condenser previously described. A conduit 67 is provided to return the cooling, or condensing water to the water source. In this embodiment, the water vapors are brought into thermal contact with the cooling, or condensing water, through a tubular or plate type of condenser with this type of condenser, the condensing water is distilled or desalinated water. This condensate water from the condenser 26 collects in the barametric conduit 62 until this condensate water reaches the liquid level control 33, at which time, the liquid level control 33 regulates the action of the condensate water valve 64. The apparatus 10 discharges condensate liquid by means of the conduit 66, sufficiently to maintain the height of the condensate water in the barametric conduit 62 at the liquid level control 30. This configuration removes condensate water, which has been kept separated from the condensing water, from the condenser 26 even though the apparatus 10 is at a pressure considerably lower than that of the atmospheric air outside of the closed apparatus 10.

Figure 3:
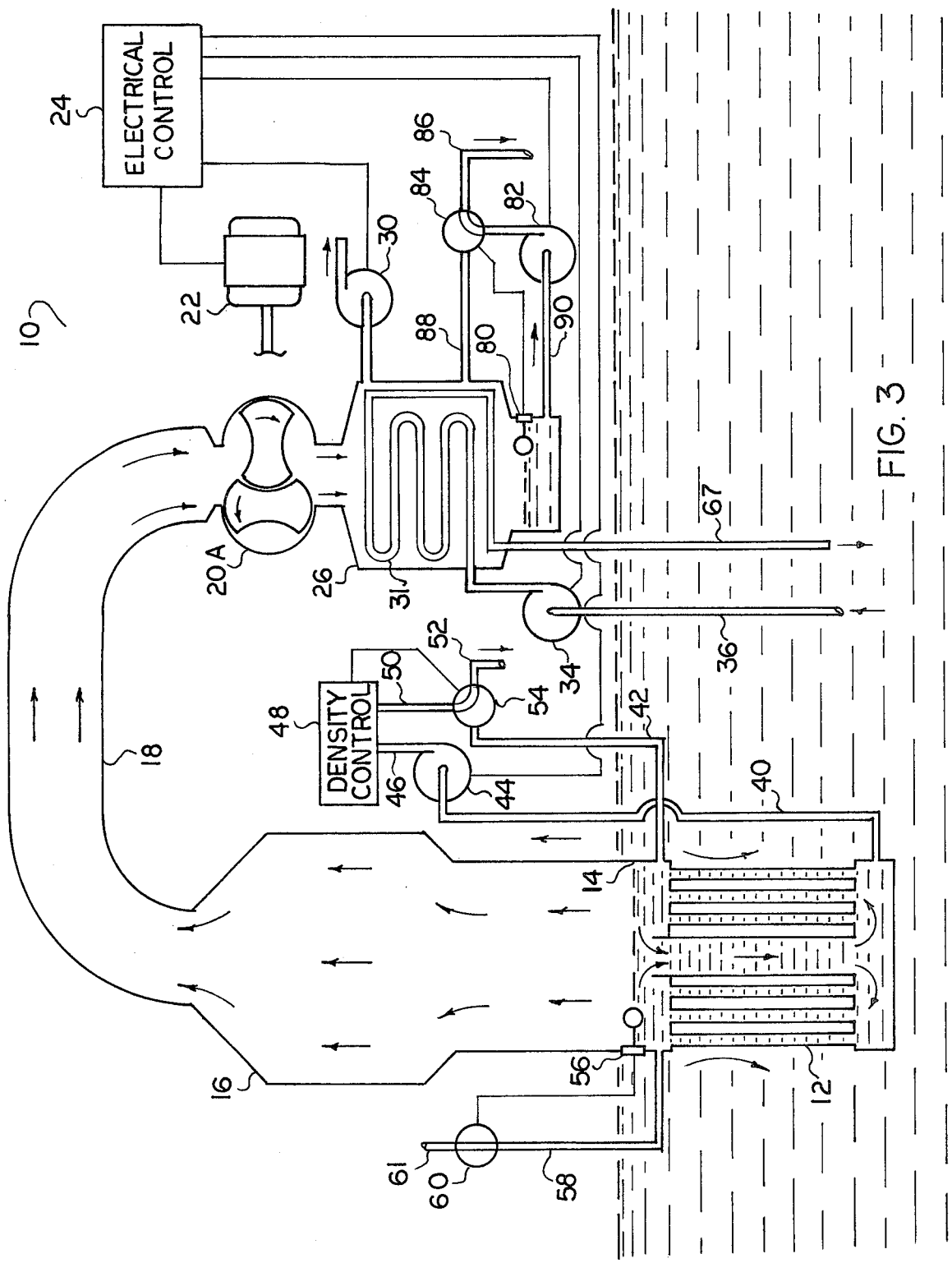
FIG. 3 is a third embodiment of the invention.

Turning now to FIG. 3 of the attached drawings, therein illustrated is an apparatus 10 wherein the height profile has been lowered by the elimination of the barametric conduit 62 as shown in FIG. 2. A liquid level control 80 is located at the bottom of the condenser 26 at the level at which it is desirable to maintain the level of the condensate water in the condenser 26. A condensate water pump means 82 is connected to the condenser 26 by means of a conduit 90 with the outlet of the condensate water pump 82 being connected to a divert valve 84. A conduit 88 connects the divert valve 84 with the condenser 26 with a conduit 86 being connected to the divert valve 84 to remove condensate water from the apparatus 10. Condensate water from the condenser 26 collects in the bottom of the condenser 26 until this condensate water reaches the liquid level control 80, at which time the liquid level control 80 regulates the action of the divert valve 84 letting condensate water out of the apparatus 10 sufficiently to maintain the condensate water level in the condenser 26 by alternately diverting the flow of condensate water through conduit 86, out of the apparatus 10, and conduit 88 which returns the flow of condensate water back into the condenser 26. It can thus be seen that an alternate method of removing condensate water from the condenser 26, even though the apparatus 10 is at a pressure considerably lower than that of the atmospheric air outside of the closed apparatus 10.

Still referring to FIG. 3 of the attached drawings, it can be seen that the apparatus 10 has a lower height profile as a result of the elimination of any barametric conduits and the use of the method shown to remove condensate water from the apparatus 10. The prime mover 20A is of the roots type positive displacement type and is shown here by way of illustration and either of the types of prime movers described in any of the drawings could be used with any other combination of elements as desired.

A heat pump method of concentrating fluids has thus been described, whereby the temperature differentials present in the ocean, or other warm and cold water sources, is the only energy source required to power the apparatus and provide excess electrical energy for external usage.

The foregoing process and apparatus has a substantial savings over that of the prior art in that no conventional energy sources are required to operate the apparatus so described.

The present disclosure includes that contained in the appended claims, as well as that of the foregoing description. Although this invention has been described in its preferred forms with a certain degree of particularity, it is understood that the present disclosure of the preferred forms has been made only by way of example and numerous changes in the details of construction and the combination and arrangement of parts may be resorted to without departing from the spirit and scope of the invention.

Having thus described the invention, I claim:

1. An apparatus for concentrating a fluid through the use of a warm liquid and a cool liquid and for providing electrical power, comprising in combination;
   an evaporator;
   input means connected to said evaporator for introducing a fluid into said evaporator;
   said evaporator producing a concentrated fluid and a vapor;
   output means connected to said evaporator for removing the concentrated fluid from said evaporator;
   a condenser;
   a conduit interconnecting said evaporator and said condenser;
   a closed heat exchanger means for thermally coupling the warm liquid to the fluid in said evaporator;
   said closed heat exchanger means isolating the fluid to be concentrated from the warm liquid to prevent intermingling therebetWeen;
   means for thermal coupling the cool liquid to said condenser thereby creating a mass flow of vapors from said evaporator and said condenser;
   a prime mover interposed in said conduit for converting the mass flow of vapors into mechanical movement;
   an electrical generator coupled to said prime mover for generating electrical energy; and
   electrical control means connected to said electrical generator for directing the output of said electrical generator for operating the apparatus and for directing excess electrical energy produced by said electrical generator for external use.

2. An apparatus as set forth in claim 1, including a particle separation chamber interposed between said evaporator and said prime mover for reducing the velocity of the vapors emanating from said evaporator.

3. An apparatus as set forth in claim 2, wherein said particle separation chamber comprises a cross-sectional area substantially greater than the cross-sectional area of said conduit.

4. An apparatus as set forth in claim 3, including a vacuum pump coupled to said conduit for reducing the internal pressure in said conduit for initiating evaporation of the fluid in said evaporator.

5. An apparatus as set forth in claim 4, wherein said input means includes an input conduit having an input valve interposed therein for regulating the fluid entering said evaporator.

6. An apparatus as set forth in claim 5, including a fluid level control means connected to said input valve for controlling the fluid flow into said evaporator in accordance with the fluid level therein.

7. An apparatus as set forth in claim 6, wherein said condenser includes a barometric conduit connected to said condenser to provide a barometric leg for the removal of condensate water from the low pressure in said condenser to the high pressure of the atmospheric air.

8. An apparatus as set forth in claim 7, wherein said evaporator comprises a plurality of tubular heat exchanger means for providing thermal exchange between the fluid to be concentrated and the warm liquid.

9. An apparatus as set forth in claim 8, including a circulation pump for circulating the warm liquid relative to said heat exchanger means.

10. An apparatus for concentrating a fluid through the use of a warm liquid and a cool liquid and for providing electrical power, comprising in combination:
- an evaporator;
- input means connected to said evaporator for introducing a fluid into said evaporator;
- said evaporator producing a concentrated fluid and a vapor;
- output means connected to said evaporator for removing the concentrated fluid from said evaporator;
- a condenser;
- a conduit interconnecting said evaporator and said condenser;
- a closed heat exchanger means for thermally coupling the warm liquid to the fluid in said evaporator;
- means for thermally coupling the cool liquid to said condenser thereby creating a mass flow of vapors from said evaporator and said condenser;
- a prime mover interposed in said conduit for converting the mass flow of vapors into mechanical movement;
- an electrical generator coupled to said prime mover for generating electrical energy;
- electrical control means connected to said electrical generator for directing the output of said electrical generator for operating the apparatus and for directing excess electrical energy produced by said electrical generator for external use;
- said output means includes a density control means;
- a density pump means for pumping the concentrated fluid from said evaporator through the said density control means; and
- a divert valve means for diverting the flow of concentrated fluid from the said apparatus when the density of the fluid exceeds a desired density level and for diverting the flow of said fluid back into the said evaporator when the density of the fluid is less than the desired density level.

* * * * *

UNITED STATES PATENT AND TRADEMARK OFFICE
CERTIFICATE OF CORRECTION

PATENT NO. : 4,186,311
DATED : January 29, 1980
INVENTOR(S) : Gerald F. Humiston It is certified that error appears in the above—identified patent and that said Letters Patent is hereby corrected as shown below:

Column 1, line 29, delete "to";

Column 5, line 57, delete "directed" and insert -- diverted --.

Signed and Sealed this

Eleventh Day of November 1980

[SEAL]

Attest:

SIDNEY A. DIAMOND

Attesting Officer

Commissioner of Patents and Trademarks